United States Patent
Copeland, III

(10) Patent No.: US 7,185,368 B2
(45) Date of Patent: Feb. 27, 2007

(54) FLOW-BASED DETECTION OF NETWORK INTRUSIONS

(75) Inventor: John A. Copeland, III, Atlanta, GA (US)

(73) Assignee: Lancope, Inc., Atlanta, GA (US)

(*) Notice: Subject to any disclaimer, the term of this patent is extended or adjusted under 35 U.S.C. 154(b) by 887 days.

(21) Appl. No.: 10/000,396

(22) Filed: Nov. 30, 2001

(65) Prior Publication Data
US 2003/0105976 A1  Jun. 5, 2003

Related U.S. Application Data

(60) Provisional application No. 60/265,194, filed on Jan. 31, 2001, provisional application No. 60/250,261, filed on Nov. 30, 2000.

(51) Int. Cl.
G06F 11/30 (2006.01)

(52) U.S. Cl. ............... 726/25; 726/22; 726/23; 726/26; 713/151; 709/203; 709/224; 709/227; 705/51

(58) Field of Classification Search ............ None
See application file for complete search history.

(56) References Cited

U.S. PATENT DOCUMENTS

| | | | | |
|---|---|---|---|---|
| 5,437,244 | A | * 8/1995 | Van Gilst | 119/73 |
| 5,557,686 | A | * 9/1996 | Brown et al. | 382/115 |
| 5,557,742 | A | 9/1996 | Smaha et al. | |
| 5,621,889 | A | 4/1997 | Lermuzeaux et al. | |
| 5,796,942 | A | * 8/1998 | Esbensen | 713/201 |
| 5,825,750 | A | * 10/1998 | Thompson | 370/244 |
| 5,970,227 | A | 10/1999 | Dayan et al. | |

(Continued)

FOREIGN PATENT DOCUMENTS

WO  PCT/US99/29080  6/2000

(Continued)

OTHER PUBLICATIONS

Javitz H S et al.: "The SRI IDES Statistical Anomaly Detector", Proceedings of the Symposium on Research in Security and Privacy US Los Alamitos, IEEE Comp. Soc. Press, v. Symp. 12, pp. 316-326 XP000220803ISBN; 0-8186-2168-0, p. 316, col. 1, line 1, p. 318, col. 1, line 3.*

(Continued)

*Primary Examiner*—Nasser Moazzami
*Assistant Examiner*—Ronald Baum
(74) *Attorney, Agent, or Firm*—Morris, Manning & Martin, LLP

(57) ABSTRACT

A flow-based intrusion detection system for detecting intrusions in computer communication networks. Data packets representing communications between hosts in a computer-to-computer communication network are processed and assigned to various client/server flows. Statistics are collected for each flow. Then, the flow statistics are analyzed to determine if the flow appears to be legitimate traffic or possible suspicious activity. A concern index value is assigned to each flow that appears suspicious. By assigning a value to each flow that appears suspicious and adding that value to the total concern index of the responsible host, it is possible to identify hosts that are engaged in intrusion activity. When the concern index value of a host exceeds a preset alarm value, an alert is issued and appropriate action can be taken.

37 Claims, 9 Drawing Sheets

U.S. PATENT DOCUMENTS

| | | | |
|---|---|---|---|
| 5,991,881 A | | 11/1999 | Conklin et al. |
| 6,119,236 A * | | 9/2000 | Shipley ..................... 713/201 |
| 6,182,226 B1 | | 1/2001 | Reid et al. |
| 6,275,942 B1 | | 8/2001 | Bernhard et al. |
| 6,321,338 B1 | | 11/2001 | Porras et al. |
| 6,363,489 B1 * | | 3/2002 | Comay et al. ................. 726/22 |
| 6,453,345 B2 * | | 9/2002 | Trcka et al. ................ 709/224 |
| 6,502,131 B1 * | | 12/2002 | Vaid et al. .................. 709/224 |
| 6,628,654 B1 * | | 9/2003 | Albert et al. ............... 370/389 |
| 6,853,619 B1 * | | 2/2005 | Grenot ....................... 370/232 |
| 6,891,839 B2 * | | 5/2005 | Albert et al. ............... 370/401 |
| 2002/0104017 A1 * | | 8/2002 | Stefan ........................ 713/201 |
| 2002/0133586 A1 * | | 9/2002 | Shanklin et al. ............ 709/224 |
| 2004/0187032 A1 * | | 9/2004 | Gels et al. ................... 713/201 |
| 2004/0237098 A1 * | | 11/2004 | Watson et al. ................ 725/25 |

FOREIGN PATENT DOCUMENTS

WO      PCT/US00/29490      5/2001

OTHER PUBLICATIONS

Lunt T F et al: "Knowledge-based Intrusion Detection", Proceedings of the Annual Artificial Intelligence Systems in Government Conf. US, Washington, IEEE Comp. Soc. Press, vol. Conf. 4, pp. 102-107 XP000040018 p. 102, col. 1, line 1, p. 105, col. 2, line 21.*

Mahoney, M., "Network Traffic Anomaly Detection Based on Packet Bytes", ACM, 2003, Fl. Institute of Technology, entire document, http://www.cs.fit.edu/~mmahoney/paper6.pdf.*

Copeland, John A., et. al., "IP Flow Identification for IP Traffic Carried Over Switched Networks," The International Journal of Computer Telecommunications Networking Computer Networks 31 (1999), pp. 493-504.

Cooper, Mark "An Overview of Intrusion Detection Systems," Zinetica White Paper, (www.xinetica.com) Nov. 19, 2001.

Newman, P., et. al. "RFC 1953: Ipsilon Flow Management Protocol Specification for IPv4 Version 1.0" (www.xyweb.com/rfc/rfc1953.html) May 19, 1999.

Paxson, Vern, "Bro: A System for Detecting Network Intruders in Real-Time," 7th USENIX Security Symposium, Lawrence Berkkeley National Laboratory, San Antonio, TX Jan. 26-29, 1998.

Mukherjee, Biswanath, et. al., "Network Intrusion Detection," IEEE Network, May/Jun. 1994.

"Network-vs Host-Based Intrusion Detection: A Guide to Intrusion Detection," ISS Internet Security Systems, Oct. 2, 1998, Atlanta, GA.

Barford, Paul, et. al. "Characteristics of Network Traffic Flow Anomalies," ACM SIGCOMM Internet Measurement Workshop 2001 (http://www.cs.wisc.edu/pb/ublications.html) Jul. 2001.

Frincke, Deborah, et. al., "A Framework for Cooperative Intrusion Detection" 21st National Information Systems Security Conference, Oct. 1998, Crystal City, VA.

Phrack Magazine, vol. 8, Issue 53, Jul. 8, 1998, Article 11 of 15.

"LANSleuth Fact Sheet," LANSleuth LAN Analyzer for Ethernet and Token Ring Networks, (www.lansleuth.com/features.html), Aurora, Illinois.

"LANSleuth General Features," (www.lansleuth.com/features.html), Aurora, Illinois.

Copeland, John A., et al, "IP Flow Identification for IP Traffic Carried Over Switched Networks," The International Journal of Computer and Telecommunications Networking Computer Networks 31 (1999), pp. 493-504.

Cooper, Mark "An Overview of Instrusion Detection Systems," Xinetica White Paper, (www.xinetica.com) Nov. 19, 2001.

Newman, P., et al. "RFC 1953: Ipsilon Flow Management Protocol Specificaiton for IPv4 Version 1.0" (www.xyweb.com/rfc/rfc1953.html) May 19, 1999.

* cited by examiner

FLOW-BASED INTRUSION DETECTION

PACKET HEADERS

TABLE I

| NAME | POTENTIAL INTRUDER | RESPONSE | CI VALUE |
|---|---|---|---|
| POTENTIAL TCP PROBE | TCP PACKETS | RESET PACKETS | NUMBER OF PACKETS |
| POTENTIAL UDP PROBE | UDP PACKEST | ICMP PORT UNAVAILABLEPCKETS | NUMBER OF ICMP PORT UNAVAILABLE PACKETS |
| HALF-OPEN ATTACK | HIGH NUMBER AND RATE OF SYNS | SYN-ACKS | 5000+501 PER SYN-ACK |
| TCP STEALTH PORT SCAN | MULTIPLE PACKETS FROM SAME SOURCE PORT TO DIFFERENT DESTINATION PORTS | RESETS | 8000+1010 PER PORT OVER 4 |
| UDP STEALTH PORT SCAN | MULTIPLE PACKETS FROM SAME SOURCE PORT TO DIFFERENT DESTINATION PORTS | NOTHING OR ICMP PORT UNAVAILABLE | 8000+1010 PER PORT OVER 4 |

FLOW-BASED CI VALUES

*FIG. 6*

TABLE II

| NAME | POTENTIAL INTRUDER | RESPONSE | CI VALUE |
|---|---|---|---|
| BAD FLAGS | TCP PACKET WITH UNDEFINED FLAGS | | 200 |
| SHORT UDP | UDP PACKET LESS 2 DATA BYTES | | 200 |
| ADDRESS SCAN | PACKETS TO MORE THAN 8 HOSTS ON SAME SUBNET | NOTHING OR RESETS | 3000 PER DETECT |
| PORT SCAN | PACKETS TO MORE THAN 4 PORTS | RESETS | 1010 PER PORT OVER 4 |

CI EVENT VALUES

*FIG. 7*

FLOW-BASED DETECTION OF NETWORK INTRUSIONS

CROSS REFERENCE To RELATED APPLICATIONS

This Patent Application claims priority to the U.S. provisional patent application Ser. No. 60/250,261 entitled "System and Method for Monitoring Network Traffic" filed Nov. 30, 2000 and U.S. provisional patent application Ser. No. 60/265,194 entitled "The Use of Flows to Analyze Network Traffic" filed on Jan. 31, 2001, both of which are incorporated in their entirety by reference and made a part hereof.

REFERENCE TO COMPUTER PROGRAM LISTING SUBMITTED ON CD

This application incorporates by reference the computer program listing appendix submitted on (1) CD-ROM entitled "Flow-Based Engine Computer Program Listing" in accordance with 37 C.F.R. §1.52(e). Pursuant to 37 C.F.R. §1.77(b)(4), the material on said CD-ROM is incorporated by reference herein, said material being identified as follows:

| Sizein Bytes | Date of Creation | File Name |
|---|---|---|
| 154,450 | Nov. 30, 2001 | LANcope Code.txt |

A portion of the disclosure of this patent document including said computer code contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention relates generally to the field of network monitoring and, more particularly, to an intrusion detection system that inspects all inbound and outbound network activity and identifies suspicious patterns that may indicate a network or system attack or intrusion.

BACKGROUND ART

As the world proceeds into the $21^{st}$ century, the Internet continues to grow without bounds. Networks have become indispensable for conducting all forms of business and personal communications. Networked systems allow one to access needed information rapidly, collaborate with partners, and conduct electronic commerce. The benefits offered by Internet technologies are too great to ignore. However, as with all technology advances, a trade-off ensues. While computer networks revolutionize the way one does business, the risks introduced can be substantial. Attacks on networks can lead to lost money, time, reputation, and confidential information.

One primary danger to avoid is having outside intruders gaining control of a host on a network. Once control is achieved, private company files can be downloaded, the controlled host can be used to attack other computers inside the firewall, or the controlled host can scan or attack computers anywhere in the world. Many organizations have pursued protecting their borders by the implementation of firewalls and intrusion detection systems (IDS).

Firewalls merely limit access between networks. Firewalls are typically designed to filter network traffic based on attributes such as source or destination addresses, port numbers, or transport layer protocols. Firewalls are susceptible to maliciously crafted traffic designed bypass the blocking rules established. Additionally, almost all commercially available IDS are signature based detection systems or anomaly based systems.

Signature based detection systems piece together the packets in a connection to collect a stream of bytes being transmitted. The stream is then analyzed for certain strings of characters in the data commonly referred to as "signatures." These signatures are particular strings that have been discovered in known exploits. The more signatures that are stored in a database, the longer it takes to do on exhaustive search on each data stream. For larger networks with massive amounts of data transferred, a string comparison approach is unfeasible. Substantial computing resources are needed to analyze all of the communication traffic.

Besides, even if a known exploit signature has been discovered, the signature is not useful until it is has been installed and is available to the network. In addition, signature analysis only protects a system from known attacks. Yet, new attacks are being implemented all the time. Unfortunately, a signature based detection system would not detect these new attacks and leave the network vulnerable.

Another approach to intrusion detection includes detection of unusual deviation from normal data traffic commonly referred to as "anomalies." Like signature-based detection systems, many current anomaly based intrusion detection systems only detect known methods of attacks. Some of these known anomaly based attacks include TCP/IP stack fingerprinting, half-open attacks, and port scanning. However, systems relying on known attacks are easy to circumnavigate and leave the system vulnerable. In addition, some abnormal network traffic happens routinely, often non-maliciously, in normal network traffic. For example, an incorrectly entered address could be sent to an unauthorized port and be interpreted as an abnormality. Consequently, known anomaly based systems tend to generate an undesirable number of false alarms which creates a tendency to have all alarms generated to become ignored.

Some known intrusion detection systems have tried to detect statistical anomalies. The approach is to measure a baseline and then trigger an alarm when deviation is detected. For example, if a system typically has no traffic from individual workstations at 2 am, activity during this time frame would be considered suspicious. However, baseline systems have typically been ineffective because the small amount of malicious activity is masked by the large amounts of highly variable normal activity. On the aggregate, it is extremely difficult to detect the potential attacks.

Other intrusion detection systems compare long term profiled data streams to short term profiled data streams. One such system is described in U.S. Pat. No. 6,321,338 to Porras et al. entitled "Network Surveillance." The system described in this patent does not necessarily analyze all the network traffic, but instead focus on narrow data streams. The system filters data packet into various data streams and compares short term profiles to profiles collected over a long period. However, data traffic is typically too varied to meaningfully compare short term profiles to long term profiles. For example, merely because the average FTP streams may be 3 megabytes over the long term does not indicate that a 20 megabyte stream is an anomaly. Consequently, these systems generate a significant amount of false alarms or the malicious activity can be masked by not analyzing the proper data streams.

Consequently, a scalable intrusion detection system that effectively tracks characterized and tracks network activity to differentiate abnormal behavior. Due to the impracticality of analyzing all the data flowing through the network, the system cannot rely on signature based methods. The detection system must be able to function even with the data traffic of larger networks. In addition, the system needs to quickly and efficiently determine if the network has undergone an attack without an excessive amount of false alarms.

DISCLOSURE OF THE INVENTION

The present invention provides a more accurate and reliable method for detecting network attacks based in large part on "flows" as opposed to signatures or anomalies. This novel detection system does not require an updated database of signatures. Instead, the intrusion detection system inspects all inbound and outbound activity and identifies suspicious patterns that denote non-normal flows and may indicate an attack. The computational simplicity of the technique allows for operation at much higher speeds than is possible with a signature-based system on comparable hardware.

According to one aspect of the invention, the detection system works by assigning data packets to various client/server (C/S) flows. Statistics are collected for each determined flow. Then, the flow statistics are analyzed to determine if the flow appears to be legitimate traffic or possible suspicious activity. A value, referred to as a "concern index," is assigned to each flow that appears suspicious. By assigning a value to each flow that appears suspicious and adding that value to an accumulated concern index associated with the responsible host, it is possible to identify hosts that are engaged in intruder activity without generation of significant unwarranted false alarms. When the concern index value of a host exceeds a preset alarm value, an alert is issued and appropriate action can be taken.

Generally speaking, the intrusion detection system analyzes network communication traffic for potential detrimental activity. The system collects flow data from packet headers between two hosts or Internet Protocol (IP) addresses. Collecting flow data from packet headers associated with a single service where at least one port remains constant allows for more efficient analysis of the flow data. The collected flow data is analyzed to assign a concern index value to the flow based upon a probability that the flow was not normal for data communications. A host list is maintained containing an accumulated concern index derived from the flows associated with the host. Once the accumulated concern index has exceeded an alarm threshold value, an alarm signal is generated.

BRIEF DESCRIPTION OF THE DRAWINGS

Benefits and further features of the present invention will be apparent from a detailed description of preferred embodiment thereof taken in conjunction with the following drawings, wherein like elements are referred to with like reference numbers, and wherein:

FIG. 6 is a table illustrating concern index value for C/S flows.

FIG. 7 is a table illustrating concern index values for other host activities.

BEST MODE

The described embodiment discloses a system that provides an efficient, reliable and scalable method of detecting network intrusions by analyzing communication flow statistics. The network intrusions are detected by a flow-based engine that characterizes and tracks network activities to differentiate between abnormal activity and normal communications. Flow-based detection does not rely on analyzing the data of packets for signatures of known attacks. Analyzing character strings for know attacks is extremely resource intensive and does not protect against new unknown attacks. Instead, the present intruder detection is accomplished by analyzing communication flows to determine if the communication has the flow characteristics of probes or attacks. Those skilled in the art will readily appreciate that numerous communications in addition to those explicitly described may indicate intrusion activity. By analyzing communications for flow abnormal flow characteristics, attacks can be determined without the need for resource intensive packet data analysis.

However, it is useful to discuss the basics of Internet communications to gain an understanding of the operation of the flow-based engine. Consequently, initially an overview of a flow-based detection system will be discussed. Following the overview, discussions on various aspects of Internet communications will follow. A detailed functionality of the flow-based engine of the present invention is described in detail in reference to FIG. 5 through FIG. 9.

Overview

Figure 1:
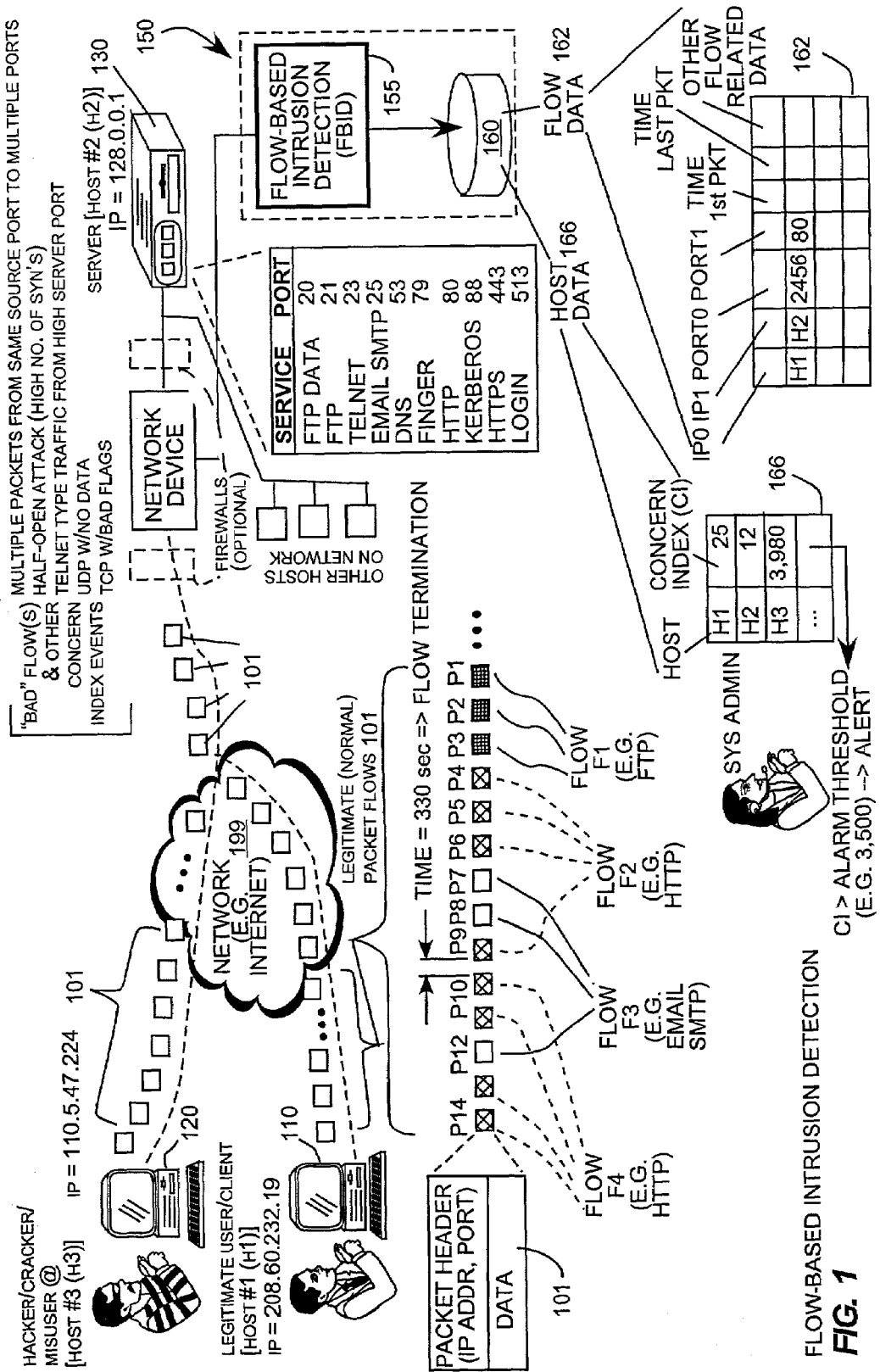
FIG. 1 is a functional block diagram illustrating a flow-based intrusion detection system constructed in accordance with a preferred embodiment of the present invention.

Turning to the figures, in which like numerals indicate like elements throughout the several figures, FIG. 1 provides an overview of a flow-based intrusion detection system or engine 155 in accordance with an exemplary embodiment of the present invention. The flow-based intrusion detection system 155 monitors network computer communications. The network computer communications are routed via a known global computer network commonly known as the Internet 199. In accordance with an aspect of the invention, the intrusion detection engine 155 is incorporated into a monitoring appliance 150, together with a database 160 that stores information utilized in the intrusion detection methodology.

The operating environment of the intrusion detection system 155 is contemplated to have numerous hosts connected by the Internet 199, e.g. Host #1, Host #2, Host #3 (also referred to as H1–H3 respectively). Hosts are any computers that have full two-way access to other computers on the Internet 199 and have their own unique IP address.

For example Host #1 has an exemplary IP address of 208.60.239.19. The Internet 199 connects clients 110 with a host server 130 in known client/server relationship.

In a typical configuration, some computers are referred to as "servers", while others are referred to as "clients." A server computer such as Host #2 130 typically provides responses to requests from client computers and provides services, data, resources, and the like. While a client computer such as Host #1 110 typically requests and utilizes the services, data, resources, and the like provided by the server.

It is known in the art to send communications between hosts via the Internet 199. The Internet Protocol (IP) is the method by which data is sent from one host computer to another on the Internet 199. Each host on the Internet 199 has an IP address that uniquely identifies it from all other computers. When data is transmitted, the message gets divided into packets 101. Packets 101 are discussed in more detail in reference to FIG. 2.

Each IP packet 101 includes a header that contains both the sender's Internet address and receiver's Internet address. The packets 101 are forwarded to the computer whose address is specified. Illustrated is a legitimate user/client 110, host #1 (H1), with an IP address of 208.60.239.19 and a server, host #2 (H2), with an IP address of 128.0.0.1.

As shown, a client 110 communications with a server 130 by sending packets 101 of data. A packet 101 is a unit of data that is routed between an origin and destination. As illustrated, messages are segmented into numerous packets 101 and routed via the Internet 199 to the receiving host. The receiving host reassembles the stream of packets 101 to recreate the original message, which is then handled by application programs running on the receiving computer system.

However, some of the hosts may be intruders 120, commonly referred to as hackers or crackers. Intruders 120 exploit vulnerable computers. As shown, the intruder 120 is a host with its own IP address of 110.5.47.224. The intruder 120 also communicates by sending packets 101 via the Internet 199. As previously stated, the packets 101 contain the IP address of the originator and destination to ensure proper routing. As shown, the stream of packets 101 sent by the intruder 120 can be interleaved with the packets 101 sent by other hosts. The packets 101 contain header information that enables the receiving host to reassemble the interleaved stream of packets into the original messages as sent.

Normal client/server (C/S) communication activity includes sending e-mails, Web traffic, file transfers, and the like. Communications via the Internet 199 need to be sent to a specific IP address and to a specific service contact port. A "port" is known to those skilled in the art as an arbitrarily assigned number to which a particular type of computing service is assigned in conventional Internet computer-to-computer communications, e.g. web traffic is conventionally on port 80, FTP traffic on ports 20 and 21, etc. The IP address specifies a specific host while the service contact port number identifies a particular server program or service that the host computer may provide. Present day port numbers range from 0 to 65,535. As shown in FIG. 1, a number of frequently-used services or processes have conventionally assigned service contact port numbers and are referred to as well-known port numbers maintained by the Internet Assigned Number Authority (IANA). These assigned port numbers are well known in the art and are typically the low numbered ports between 0 and 1023. Currently, certain higher numbered ports have also been assigned.

A service port chart in FIG. 1 lists some common services that present day Internet-based computer systems may provide. Outgoing email typically utilizes the known Simple Mail Transfer Protocol (SMTP) which is implemented over the service contact port 25. For the Hypertext Transfer Protocol (HTTP) communications, Web browsers open an ephemeral high port number to initiate Web traffic that is sent to the host server port 80. File Transfer Protocol (FTP) control communications are sent to the server port 21, while FTP data transfer originates from port 20. The FINGER service utilizes service contact port 79, the domain name service (DNS) utilizes service contact port 53, and Telnet communications utilize service contact port 23. As illustrated, common services are typically associated with specific predetermined service contact ports.

Also illustrated in FIG. 1 are four flows, F1 through F4, between by client host #1 110 and service host #2 130. Flow F1 is a file transfer utilizing the File Transfer Protocol (FTP). As shown, the file transfer (flow F1) is delivered by a stream of packets 101 (P1-P3) that will be reassembled by the receiving host 110.

After the file transfer is completed, the client 110 initiates an HTTP Web session (flow F2) with server 120. Those skilled in the art understand that a Web session typically occurs when an Internet browser computer program such as MICROSOFT INTERNET EXPLORER or NETSCAPE NAVIGATOR requests a web page from a World Wide Web (WWW) service on port 80. Packets P4, P5, P6, and P9 are associated with the Web traffic of flow F2. These packets may contain data such as a JPG format picture to be displayed, text, a JAVA program, or other informational materials to be displayed or handled by the client's Internet browser program.

Continuing the example of FIG. 1, while the web session of flow F2 is still open, the client 110 sent an email illustrated by flow F3. As shown, the email packets of flow F3 may be interleaved with the previously opened Web session of flow F2. As illustrated, packets P7, P8, and P12 contain the e-mail message.

Finally, the client 110 requests another web page from the server 120, initiating yet another HTTP flow F4. Packets P9, P10, P11, P12, and P14 represent the new Web traffic.

In accordance with an aspect of the invention, a flow is considered terminated after a predetermined period of time has elapsed on a particular connection or port. For example, if HTTP Web traffic on port 80 ceases for a predetermined period of time, but other traffic begins to occur on port 80 after the expiration of that predetermined time period, it is considered that a new flow has begun, and the system responds accordingly to assign a new flow number and track the statistics and characteristics thereof. In the disclosed embodiment, the predetermined time period is 330 seconds, but those skilled in the art will understand that this time is arbitrary and may be heuristically adjusted.

Although the preferred embodiment utilizes the elapse of a predetermined period of time to delimit flows, those skilled in the art will understand and appreciate that other events, indicators, or information may be used to delimit flows, for example, predetermined characteristics of traffic on a given port, or the occurrence of a FIN flag in a packet in traffic, etc. Other such events or indicators will occur to those skilled in the art.

In the example of FIG. 1, because a period of time (330 seconds in this example) has elapsed since the server last processed any Web traffic, the new Web traffic with packets P9, P10, P11, P12, and P14 is considered a new flow (F4). If the new Web page was requested within the predetermined time period that defines the end of a flow, the new traffic would be included as part of flow F3.

Intruders 120 send data over the network intending to do harm or to scout details about the hosts on the network that will let them do harm in future. Because intruders 120 have different objectives, intruders 120 typically send communications that are not normal for client/server communications.

For example, intruders may scan numerous high level ports which would not happen in normal client/server communications or an intruder may send a User Datagram Protocol (UDP) packet, which is commonly used with streaming media, with no data attached. An intruder may attempt to identify which operating system a host is utilizing by sending a packet with undefined set of TCP flags. A high number of TCP packets 101 to a single host from another host may indicate a half open attack trying to tie up the target's resources. Each of these suspicious activities is not normally seen in normal network traffic.

In accordance with an aspect of the invention, a variable denominated as "concern index" (CI) is provided in association with each host identified by the intrusion detection engine 155. This concern index CI variable is used to accumulate values associated with various abnormal events occurring on the network, e.g. when a particular flow is deemed unusual or when particular types of anomalous events occur. At such time as the cumulated value of the CI variable for a particular host exceeds a predetermined threshold value, that host may be considered a sufficient threat to warrant generating an alert or alarm and action taken.

Consequently, abnormal flows and/or events identified by the intrusion detection engine 155 will raise the concern index (CI) for the associated host. The intrusion detection engine 155 analyzes the data flow between IP devices. However, different types of services have different flow characteristics associated with that service. Therefore, a C/S flow can be determined by the packets exchanged between the two hosts dealing with the same service.

In accordance with an aspect of the invention, the intrusion detection engine 155 works by assigning data packets 101 to various flows. The engine 155 collects information about and statistics associated with each flow and stores this information and statistics in a database 160. The flow database 160 comprises a flow data structure 162 and a host data structure 166. The flow data structure 162 stores collected flow information such as the IP addresses. The engine determines which host has a lower IP address and assigns that host IP0. The other host is assigned IP1. Port0 is associated with IP0 and port1 is the service connection port for host1. The flow data structure 162 also stores time and other related packet information derived from the packet header. In the disclosed embodiment, this time information (e.g. time of the first packet, time of the last packet) is utilized to measure the elapse of time for purposes of flow delimiting, as described above.

The intrusion detection engine 155 analyzes the flow data 160 to determine if the flow appears to be legitimate traffic or possible suspicious activity. Flows with suspicious activity are assigned a predetermined concern index (CI) value based upon a heuristically predetermined assessment of the significance of the threat of the particular traffic or flow or suspicious activity. The flow concern index values have been derived heuristically from extensive network traffic analysis. Concern index values are associated with particular hosts and stored in the host data structure 166 (FIG. 1). Exemplary concern index values for various exemplary flow-based events and other types of events are illustrated in connection with FIGS. 6 and 7.

By assigning a value to each flow that appears suspicious and adding that value to a total CI of the host responsible for the flow, it is possible to identify hosts that are engaged in intruder activities. When the CI of a host exceeds a preset alarm threshold, a alarm signal may be generated. In the example of FIG. 1, host H3 has an accumulated CI of 3,980. This exceeds the preset threshold of 3,500 for that network and a system administrator (SYS ADMIN) may be notified by alert message, dialog box, pager, email, telephone, or other alarm means.

The host servers 130 are coupled to one or more network devices 135 such as routers, switches, or hubs. In a typical preferred configuration for the present invention, a monitoring appliance 150 operating a flow-based intrusion detection engine 155 is coupled to one of the network devices 135 or to a tap in a Internet backbone link. The monitoring appliance 150 monitors the communications between the host server 130 and other hosts 120, 110 in the attempt to detect intrusion activity.

Those skilled in the art understand that many networks utilize firewalls to limit unwanted network traffic. A monitoring appliance 150 can be connected before a firewall to detect intrusions directed at the network. Conversely, the monitoring appliance 150 may be installed behind a firewall to detect intrusions that bypass the firewall. Some systems install two firewalls with web and e-mails servers in the so-called "demilitarized zone" or "DMZ" between firewalls. One common placement of the monitoring appliance 150 is in this demilitarized zone. Of course, those skilled in the art will appreciate that the flow-based intrusion detection system 155 or appliance 150 can operate without the existence of any firewalls.

It will now be appreciated that the disclosed methodology of intrusion detection is accomplished at least in part by analyzing communication flows to determine if such communications have the flow characteristics of probes or attacks. By analyzing communications for abnormal flow characteristics, attacks can be determined without the need for resource-intensive packet data analysis. A flow can be determined from the packets 101 that are transmitted between two hosts utilizing a single service. The addresses and port numbers of communications are easily discerned by analysis of the header information in a datagram.

Packet

Figure 2:
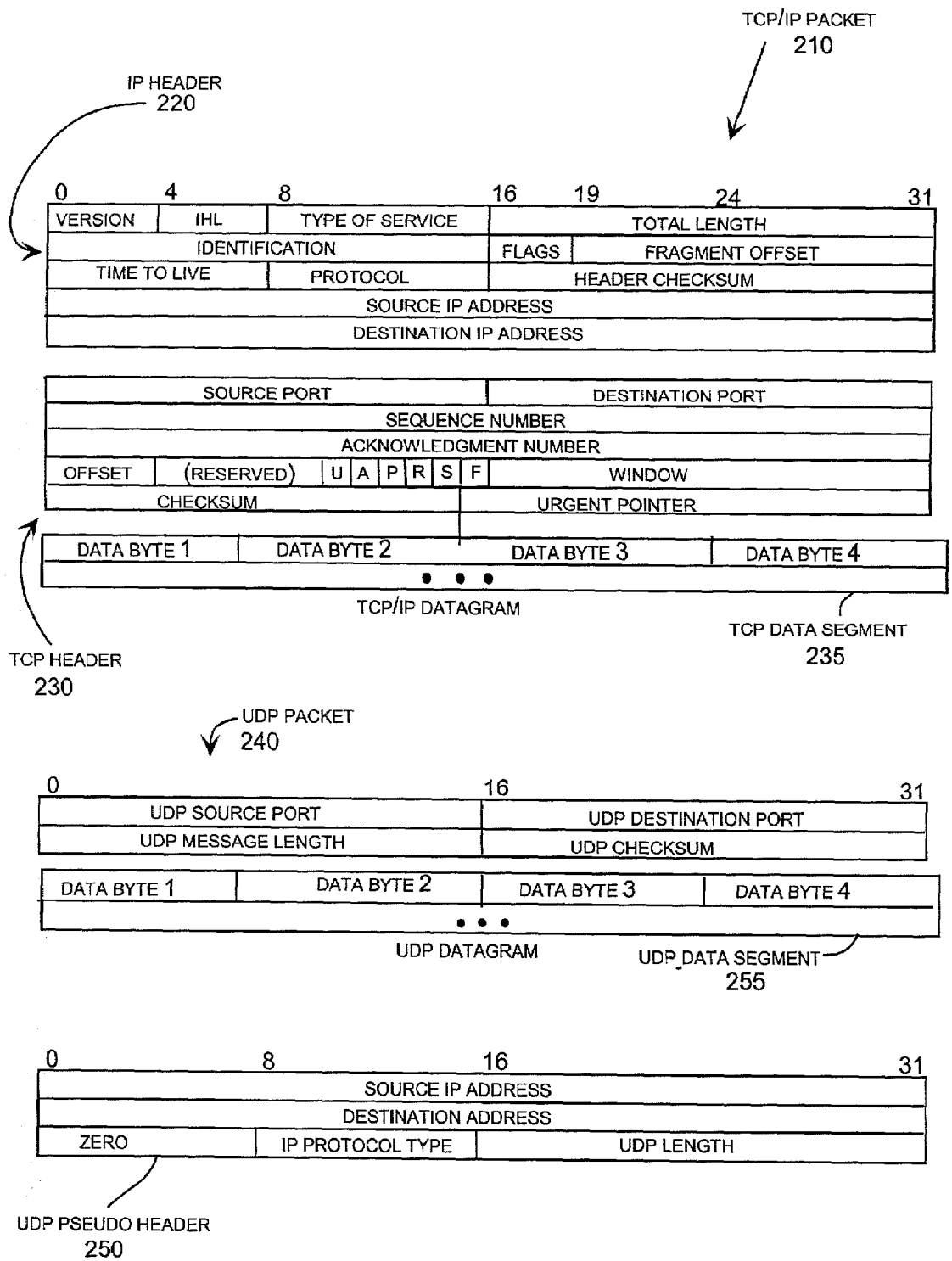
FIG. 2 is a diagram illustrating headers of datagrams.

Referring now to FIG. 2, and inasmuch as an understanding of Internet data packets is helpful for constructing embodiments of the present invention, a description of such packets, also called "datagrams", will next be provided as an aid to understanding. A packet or datagram 101 is a self-contained, independent entity or unit of data carrying sufficient information to be routed from a source to a destination computer without reliance on earlier exchanges between the source and destination computer. Packets 101 have a header and a data segment as illustrated by FIG. 2. The term "packet" in present-day parlance has generally replaced the term "datagram".

Restated, a packet 101 is the unit of data that is routed between an origin and destination on a packet-switched network such as the Internet 199. A packet-switching scheme is an efficient method of handling transmissions on a connectionless network. However, connection-oriented protocols can be utilized to create a session. A session is a series of interactions between two communication end points that occur during the span of a single connection. A detailed discussion of a TCP/IP session is described in reference to FIG. 3. However, a host can send a message without establishing a connection with the recipient. That is, the host simply sends a packet 101 onto the network 199 with the destination address and hopes that it arrives.

FIG. 2 illustrates an exemplary TCP/IP packet or datagram 210 and an exemplary UDP datagram 240. In a typical TCP/IP packet like 210, each packet typically includes a header portion comprising an IP header 220 and a TCP header 230, followed by a data portion that contains the information to be communicated in the packet. The information in the IP header 220 contained in a TCP/IP packet 210, or any other IP packet, contains the IP addresses and assures that the packet is delivered to the right host. The transport layer protocol (TCP) header follows the Internet protocol header and specifies the port numbers for the associated service.

The header portion in the typical TCP/IP datagram 210 is 40 bytes including 20 bytes of IP header 220 information and 20 bytes of TCP header 230 information. The data portion or segment associated with the packet 210 follows the header information.

In regards to a typical IP packet 210, the first 4 bits of the IP header 220 identify the Internet protocol (IP) version. The following 4 bits identify the IP header length in 32 bit words. The next 8 bits differentiate the type of service by describing how the packet should be handled in transit. The following 16 bits convey the total packet length.

Large packets tend to be fragmented by networks that cannot handle a large packet size. A 16-bit packet identification is used to reassemble fragmented packets. Three one-bit set of fragmentation flags control whether a packet is or may be fragmented. The 13-bit fragment offset is a sequence number for the 4-byte words in the packet when reassembled. In a series of fragments, the first offset will be zero.

After the fragmentation information, an 8-bit time to live field specifies the remaining life of a packet and is decremented each time the packet is relayed. If this field is 0, the packet is destroyed. Next is an 8-bit protocol field that specifies the transport protocol used in the data portion. The following 16-bit field is a header checksum on the header only. Finally, the last two fields illustrated contain the 32-bit source address and 32-bit destination address. IP packet data follows the address information.

In a TCP/IP datagram 210, the initial data of the IP datagram is the TCP header 230 information. The initial TCP header 230 information includes the 16-bit source and 16-bit destination port numbers. A 32-bit sequence number for the data in the packet follows the port numbers. Following the sequence number is a 32-bit acknowledgement number. If an ACK flag (discussed below) is set, this number is the next sequence number the sender of the packet expects to receive. Next is a 4-bit data offset, which is the number of 32-bit words in the TCP header. A 6-bit reserved field follows.

Following the reserved field, the next 6 bits are a series of one-bit flags, shown in FIG. 2 as flags U, A, P, R, S, F. The first flag is the urgent flag (U). If the U flag is set, it indicates that the urgent pointer is valid and points to urgent data that should be acted upon as soon as possible. The next flag is the A (or ACK or "acknowledgment") flag. The ACK flag indicates that an acknowledgment number is valid, and acknowledges that data has been received. The next flag, the push (P) flag, tells the receiving end to push all buffered data to the receiving application. The reset (R) flag is the following flag, which terminates both ends of the TCP connection. Next, the S (or SYN for "synchronize") flag is set in the initial packet of a TCP connection where both ends have to synchronize their TCP buffers. Following the SYN flag is the F (for FIN or "finish") flag. This flag signifies that the sending end of the communication and the host will not send any more data but still may acknowledge data that is received.

Following the TCP flag bits is a 16-bit receive window size field that specifies the amount of space available in the receive buffer for the TCP connection. The checksum of the TCP header is a 16-bit field. Following the checksum is a 16 bit urgent pointer that points to the urgent data. The TCP/IP datagram data follows the TCP header.

Still referring to FIG. 2, a typical User Datagram Protocol (UDP) packet 240 provides a procedure for application programs to send messages to other programs with a minimal of protocol mechanisms. The IP protocol previously described is used as the underlying protocol. The UDP protocol is transaction oriented and delivery protection is not guaranteed. Applications requiring reliable delivery of data typically use the previously described Transmission Control Protocol (TCP).

The 16-bit UDP source port is a field to which port a reply, when meaningful, should be addressed. The 16-bit UDP destination port specifies the server program on the receiving host to execute the packet. Next, the 16-bit UDP message length field is the length in bytes of the user datagram including header and any data. Following the length field is the 16-bit checksum of the UDP header, the UDP pseudo header information 250 from an IP header 220, and the data.

Figure 3:
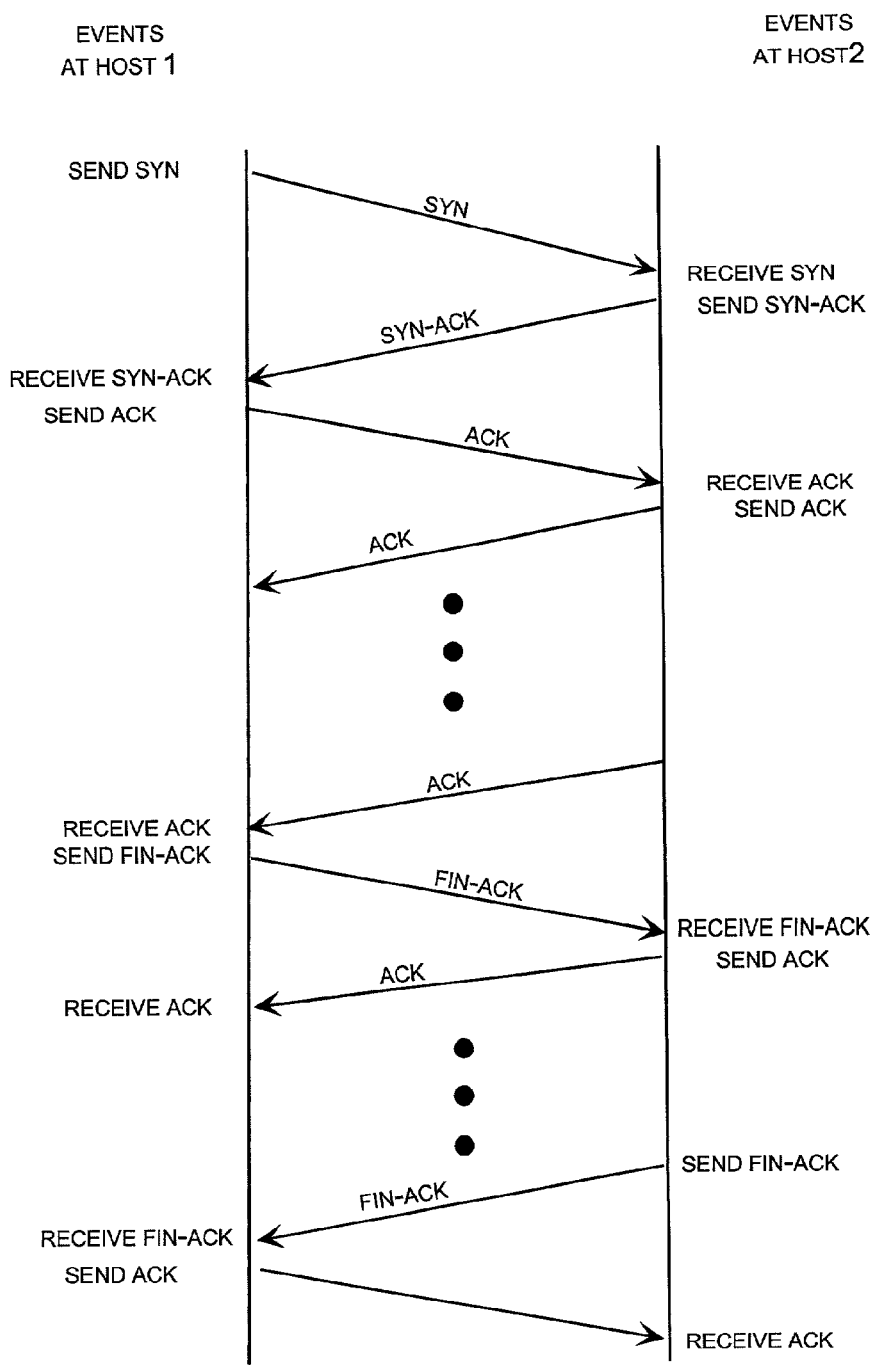
FIG. 3 is a functional block diagram illustrating an exemplary normal TCP communication.

As will be understood by those skilled in the art, the fundamental Internet service consists of a packet delivery system. Internet service is typically considered "connectionless" because each packet is treated independently of all others. Some transport protocols such as UDP provide unreliable service because the delivery of the packet is not guaranteed. Other transport protocols such as TCP provide a mechanism to ensure delivery of a packet and therefore can be used to establish computer-to-computer "sessions" in the conventional sense of the term. FIG. 3 illustrates a typical TCP/IP session and the guaranteed packet delivery mechanism.

As previously stated, the flow-based engine 155 does not analyze the data segments of packets for signature identification. Instead, the engine 155 associates all packets with a flow. It analyzes certain statistical data and assigns a concern index value to abnormal activity. The engine 155 builds a concern index for suspicious hosts by detecting suspicious activities on the network. An alarm is generated when those hosts build enough concern (in the form of a cumulated CI value) to cross the network administrator's predetermined threshold.

Session

Turning next to FIG. 3, a TCP session 300 is a full duplex connection that allows concurrent transfer of data in both directions. Before the transfer can start, both the sending and receiving application programs interact with their respective operating systems, informing them of the impending stream transfer. Protocol software communicates by sending messages across, verifying that the transfer is authorized, and indicating that both sides are ready to receive data.

FIG. 3 illustrates an exemplary TCP/IP session 300. As discussed in reference to FIG. 2, the SYN flag is set whenever one host initiates a session with another host. In the initial packet, host 1 sends a message with only the SYN flag set. The SYN flag is designed to establish a TCP connection and allow both ends to synchronize their TCP buffers. Host1 provides the sequence of the first data packet it will send.

Host2 responds with a SYN-ACK packet. In this message, both the SYN flag and the ACK flag is set. Host2 provides the initial sequence number for its data to Host1. Host2 also sends to Host1 the acknowledgment number which is the next sequence number Host2 expects to receive from host 1. In the SYN-ACK packet sent by Host 2, the acknowledgment number is the initial sequence number of Host 1 plus 1, which should be the next sequence number received.

Host 1 responds to the SYN-ACK with a packet with just the ACK flag set. Host 1 acknowledges that the next packet of information received from Host 2 will be Host 2's initial sequence number plus 1. The three-way handshake is complete and data is transferred.

Host2 responds to ACK packet with its own ACK packet. Host2 acknowledges the data it has received from Host1 by sending an acknowledgment number one greater than its last received data sequence number. Both hosts send packets with the ACK flag set until the session is to end although the P and U flags may also be set, if warranted.

As illustrated, when host1 terminates its end of the session, it sends a packet with the FIN and ACK flags set. The FIN flag informs Host2 that no more data will be sent by Host1. The ACK flag acknowledges the last data received by Host1 by informing Host2 of the next sequence number it expects to receive.

Host2 acknowledges the FIN packet by sending its own ACK packet. The ACK packet has the acknowledgement number one greater than the sequence number of Host1's FIN-ACK packet. ACK packets are still delivered between the two hosts, except that HOST1's packets have no data appended to the TCP/IP end of the headers.

When Host 2 is ready to terminate the session, it sends its own packet with the FIN and ACK flags set. Host1 responds that it has received the final packet with an ACK packet providing to Host2 an acknowledgment number one greater than the sequence number provided in the FIN-ACK packet of Host2.

Alternatively, a host may desire to keep a session active even after if has finished sending its current data. If more data is to be sent in the near future, it is more efficient to keep a session open than it is to open multiple sessions. A session wherein the connection is kept open in case future data is to be communicated is typically referred to as a "persistent" session. In this scenario, a session is closed by sending a packet with the reset flag (R) set (also called a "reset packet") after no data is delivered after a period of time. Many browser applications provide a 300-second window of inactivity before closing a session with an R packet (reset).

The described TCP session 300 of FIG. 3 is a generic TCP session in which a network might engage. In accordance with the invention, flow data is collected about the session to help determine if the communication is abnormal. In the preferred embodiment, information such as the total number of packets sent, the total amount of data sent, the session start time and duration, and the TCP flags set in all of the packets, are collected, stored in the database 160, and analyzed to determine if the communication was suspicious. If a communication is deemed suspicious, i.e. it meets predetermined criteria, a predetermined concern index value associated with a determined category of suspicious activity is added to the cumulated CI value associated with the host that made the communication.

For example, a TCP/IP packet with both the SYN flag and the FIN flag set would not exist in a normal communication. Because a packet with both the SYN and FIN flags set is undefined, each operating system handles this packet in different methods. An operating system may send an ICMP message, a reset, or possibly just ignore it and send nothing. Consequently, an intruder may send a SYN-FIN packet specifically to help identify the operating system of the targeted host.

As another example, if a particular host sends a large number of SYN packets to a target host and in response receives numerous R packets from the targeted host, a potential TCP probe is indicated. Likewise, numerous UDP packets sent from one host to a targeted host and numerous ICMP "port unavailable" packets received from the targeted host indicates a potential UDP probe. A stealth probe is indicated by multiple packets from the same source port number sent to different port numbers on a targeted host.

As has been described elsewhere, UDP packets are often used in connection with streaming media and other applications that provide data to many hosts. A UDP packet with no appended data does not occur in normal communications. In fact, a flow with numerous SYN packets with numerous SYN-ACK responses may indicate a half-open attack designed to tie up the targeted host's ports and resources. From the foregoing, it will be understood and appreciated that an analysis of the flow of communications can identify attacks on a system.

Some typical abnormal communications that indicate intrusion activity are listed in reference to FIGS. 6 and 7. However, each type of service has its own profile of normal activity. Consequently, it is desirable to analyze each type of service and ascertain the characteristics of a "normal" flow, including the normal sequence of flags and the like.

Flow

In accordance with an exemplary aspect of the invention, a "flow" can be determined by the packets exchanged between two hosts associated with a single service. A single service, it will be recalled, is typically associated with a particular port on a server, and is also associated with an assigned port on a client machine; port numbers are typically fixed in server machines such as host #2 server 130 (FIG. 1) but typically vary in client machines such as host#1 client 110. As previously described, in the preferred embodiment as described herein, a flow ends when no packets are exchanged between the hosts for a predetermined duration of time such as 330 seconds for HTTP flows.

Figure 4:
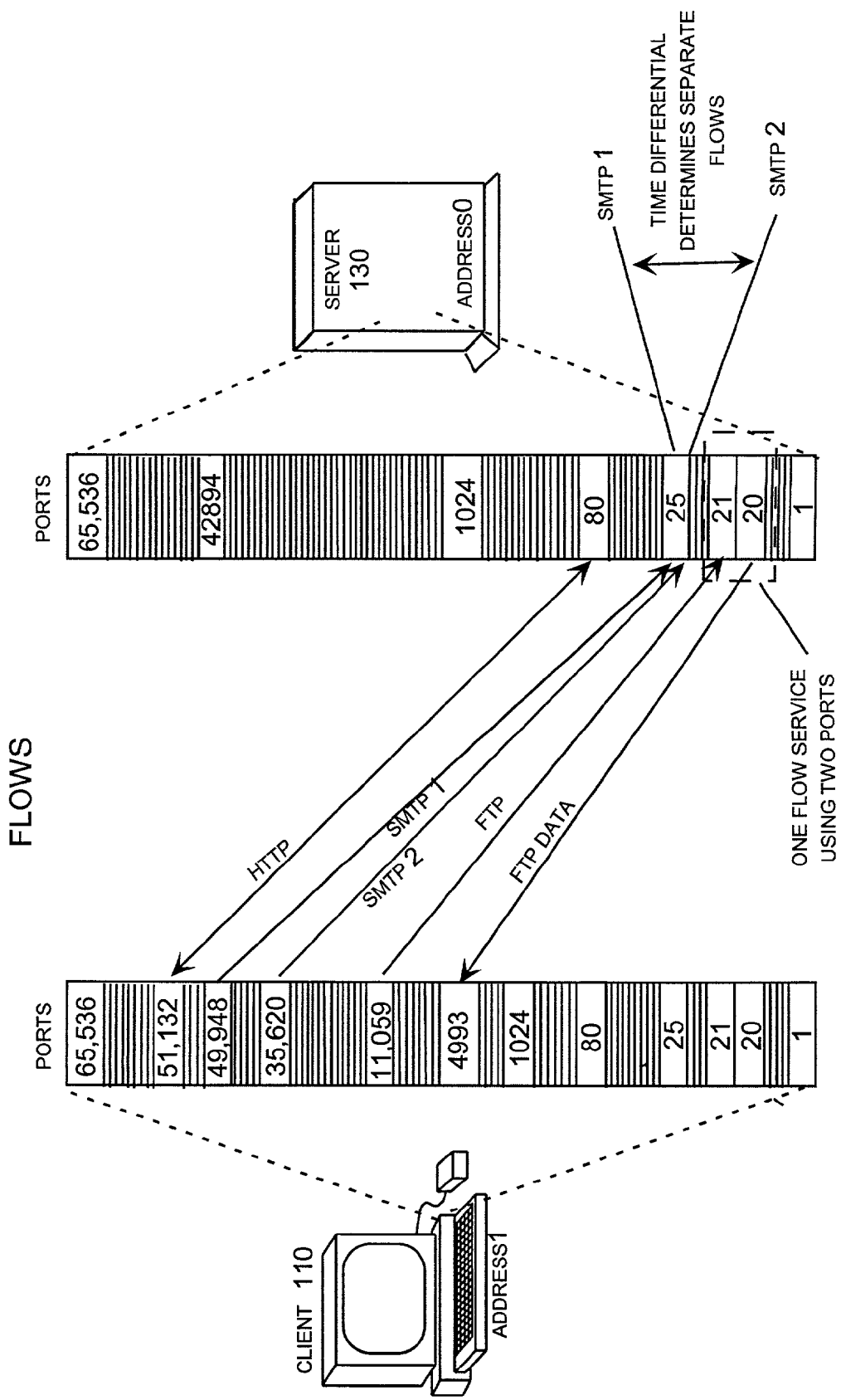
FIG. 4 is a functional block diagram illustrating C/S flows.

FIG. 4 illustrates some common flows. As is known, each host has its own unique IP address. IP addresses are typically referred to by four sets of numbers separated by periods, e.g. N.N.N.N, where N varies between 0 and 255. Also as described, assigned port numbers of the server delineate the services provided by that server; port numbers in present-day systems vary between 0 and 65,536.

The client is illustrated with an IP address of ADDRESS 1 while the server is illustrated with IP address ADDRESS0. As illustrated, three separate services—HTTP, SMTP, and FTP—are being invoked by the client. A Web browser application (not shown) running on the client machine utilizes the Hypertext Transfer Protocol (HTTP), an email application (also not shown) utilizes the Simple Mail Transfer Protocol (SMTP), and a file transfer application program (not shown) utilizes the File Transfer Protocol (FTP).

Communications utilizing each of these protocols provide differing flow characteristics. Consequently, it is desirable to determine flows in which each of the services is analyzed separately. Therefore, as defined, the illustrated communications represent three distinct flows.

The first flow illustrated would be Web traffic (HTTP protocol) between the client at IP ADDRESS1 and the server at IP ADDRESS0. The client Web browser opens a random ephemeral high port (51,132) as illustrated in the example. A high port is utilized because the low port numbers less than 1024 are preassigned for designated services. One these designated services is port 80 for HTTP, which transfers displayable Web pages and related files in the known manner. The Web browser sends the request to the server's port 80. The server port responds by sending the requested Web page data in packets wherein the port number in the packets transmitted to the client sets the destination port to 51,132 of the client. All communications by clients utilizing HTTP is sent to port 80 of the server. One C/S flow would be the HTTP communications between port 51,132 of ADDRESS1 and port 80 of ADDRESS0.

A flow is terminated if no communications occur between the two IP addresses and the one low port (e.g. port 80) for 330 seconds. Most Web browsers or a TCP connection send a reset packet (i.e. a packet with the R flag set) if no communications are sent or received for 5 minutes. An analysis can determine if the flow is abnormal or not for HTTP communications.

The next flow illustrated is email traffic between the client and server utilizing port 25. The client email application opens a random high ephemeral port, e.g. port 49,948 as illustrated in FIG. 4. The client's email application sends the email utilizing the Simple Mail Transfer Protocol (SMTP) to the server's port 25. Port 25 is conventionally designated for SMTP communications. A flow is terminated if no communications are delivered between the two IP addresses and the low port for 330 seconds. If the client sends another SMTP email packet or packets within 330 seconds of the end of the first email to the server, only one flow would exist.

For example, as shown in FIG. 4, if a second email packet originating from the ephemeral port 35,620 is sent within 330 seconds, only one flow would exist. If the second email packet was later than 330 seconds from the first sent email, it would be classified as another flow for analysis purposes. An analysis can determine if the flow is abnormal or not for SMTP communications.

The File Transfer Protocol (FTP) is the simplest method to exchange files between hosts on the Internet. A client begins a session by sending a request to communicate to port 21 of designated server machine. The client also includes a second port number to be used when data is exchanged. The server initiates the exchange from its own port 20 (FTP DATA) to the port designated by the client, port 4993 as illustrated in FIG. 4. Although two ports on the server were utilized, port 20 and port 21, this unique case will be classified as one C/S flow. Preferably, embodiments of the present invention of a flow-based intrusion detection engine will have the ability to associate the FTP communications on both ports as one flow.

As shown, a flow can be determined by the packets exchanged between two hosts associated with a single service. A port number designates a service application that is associated with the particular port. Communications utilizing differing protocols or services provide differing flow characteristics. Consequently, each of the services are analyzed separately by the flow engine 155.

Flow-Based Engine

Figure 5:
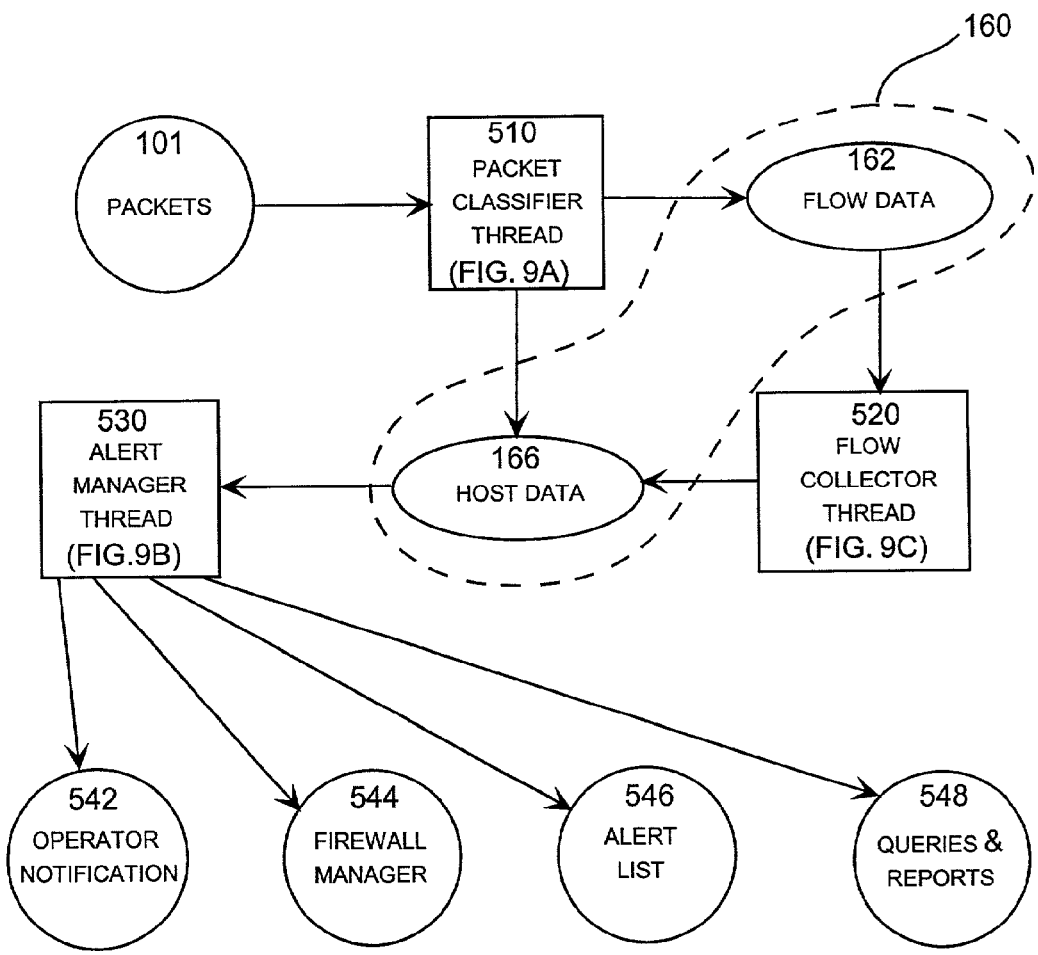
FIG. 5 is a functional block illustrating a flow-based intrusion detection engine.

FIG. 5 illustrates a logical software architecture of a flow-based intrusion detection engine 155 constructed in accordance with an embodiment of the present invention. As will be understood by those skilled in the art, the system is constructed utilizing Internet-enabled computer systems with computer programs designed to carry out the functions described herein. Preferably, the various computing functions are implemented as different but related processes known as "threads" which executed concurrently on modern day multi-threaded, multitasking computer systems.

Figure 8:
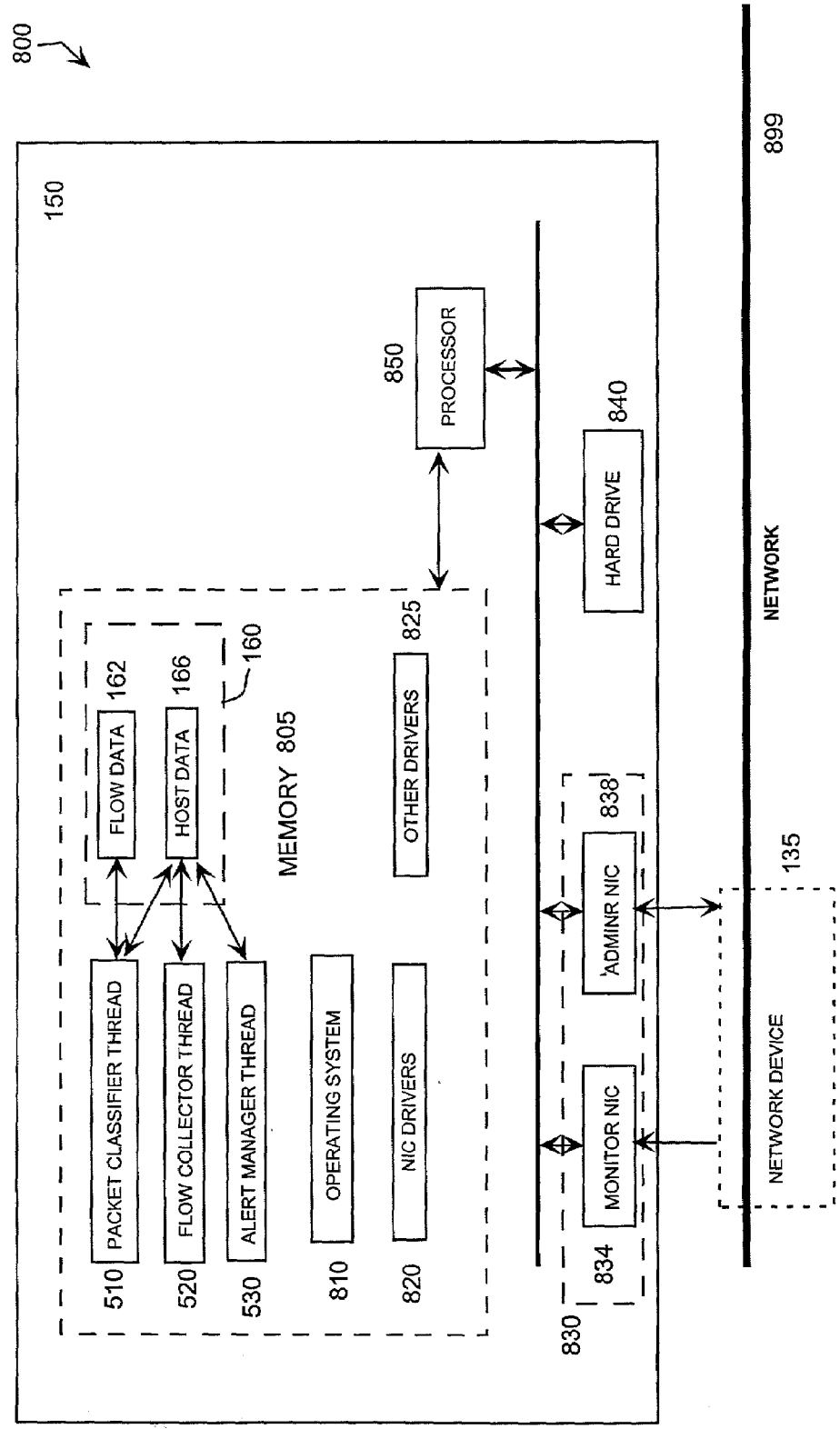
FIG. 8 is a functional block diagram illustrating hardware architecture.

The computer programs or threads are executed on a computer system 800 constructed as described in reference to FIG. 8, which illustrates a suitable exemplary computer system that may be utilized to construct a monitoring appliance 150 including an intrusion detection engine 155, or a separately implemented intrusion detection engine. Although the described embodiments are generally described in reference to an Internet-accessible computer system that is dedicated to implementing the engine 155, those skilled in the art will recognize that the present invention can be implemented in computer program code that can execute in conjunction with other program modules in various types of general purpose, special purpose, or dedicated computers. Accordingly, it will be understood that the terms "computer," "operating system," and "application program" include all types of computers and the program modules designed to be implemented by the computers.

The discussion of methods that follow, especially in the software architecture, is represented largely in terms of processes and symbolic representations of operations by conventional computer components, including a central processing unit (CPU), memory storage devices for the CPU, network communication interfaces, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network.

The processes and operations performed by the computer include the manipulation of signals by a CPU, or remote server such as an Internet Web site, and the maintenance of these signals within data structures reside in one or more of the local or remote memory storage devices. Such data structures impose a physical organization upon the collection of data stored within a memory storage device and represent specific electrical, optical, or magnetic elements. These symbolic representations are the means used by those skilled in the art of computer programming and computer construction to effectively convey teachings and discoveries to others skilled in the art. For the purposes of this discussion, a process is understood to include a sequence of computer-executed steps leading to a concrete, useful, and tangible result, namely, the detection of intruders based upon C/S flows and other activity deemed heuristically to be a threat substantial enough to warrant assignment of a concern index value.

These steps generally require manipulations of quantities such as IP addresses, packet length, header length, start times, end times, port numbers, and other packet related information. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate quantities for computer operations, and that these terms are merely conventional labels applied to quantities that exist within and during operation of the computer.

It should also be understood that manipulations within the computer are often referred to in terms such as displaying, deciding, storing, adding, comparing, moving, positioning, placing, and altering which are often associated with manual operations performed by a human operator. The operations described herein include machine operations performed in conjunction with various input provided by a human operator or user that interacts with the computer. In addition, it will be understood that the programs, processes, routines and methods described herein are not related or limited to any particular computer or apparatus, nor are they related or limited to any particular communication network or computer architectures. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

With the foregoing in mind, the drawing figures starting with FIG. 5, and the accompanying appendix of computer program code, illustrate various functions, processes, or routines carried out by an embodiment of the present invention. It will also be understood that the processes and methods presented here may be arranged differently, or steps taken in a different order. In other words, some processes and methods may be deleted, repeated, re-ordered, combined, or blended to form similar processes and methods.

FIG. 5 illustrates the operation of the preferred flow-based engine 155. The engine stores data from its operations in a database 160, which in the disclosed embodiment comprises two data structures, one used to collect statistics on data flows (flow data structure 162) in progress, and another to accumulate date on the host computers (host data structure 166) involved in those flows. It has three main threads or processes that read and write these data structures to identify possible intruders, which are identified as high concern index hosts or high CI hosts. These threads are a packet classifier thread 510, a flow collector thread 520, and an alert manager thread 530. The threads also identify the client and server network applications that are being operating by the hosts that are observed participating in the flows observed (port profiling).

Packet Classifier

The header data is read by the packet classifier thread 510. The packet classifier thread 510 runs whenever new packet information is available. Based on the source and destination IP addresses, the thread 510 searches for an existing flow in the flow data structure 162. To facilitate searching and record insertion, a symmetric hash of the two IP addresses is generated and used as the index of an array that points to the beginning of a two-way linked list of all flows with that hash value. As known to those skilled in the art, a symmetric hash is a mathematical process that creates a probabilistically unique number that facilitates rapid indexing and sorting within a data structure such as flow data structure 162.

Flow processing is done for TCP and UDP packets, and the port numbers in the transport layer header are used to identify the flow record to be updated. For ICMP packets that constitute rejections of a packet, the copy of the rejected packet in the ICMP data field is used to identify the IP addresses and port numbers of the corresponding flow.

For purposes of the description which follows, the IP address with the lower value, when considered as a 32-bit unsigned integer, is designated ip[0] and the corresponding port number is designated pt[0]. The higher IP address is designated ip[1] and the corresponding TCP or UDP port number is designated pt[1]. At some point, either pt[0] or pt[1] may be designated the "server" port by setting an appropriate bit in a bit map that is part of the flow record (record "state", bit 1 or 2 is set).

If a particular packet 101 being processed by the packet classifier 510 matches a particular entry or record in the flow data structure 162, data from that particular packet 101 is used to update the statistics in the corresponding flow data structure record. A packet 101 is considered to match to a flow data structure record if both IP numbers match and:

a) both port numbers match and no port is marked as the "server" port, or b) the port number previously marked as the "server" port matches, or c) one of the port numbers matches, but the other does not, and the neither port number has been marked as the server port (in this case the matching port number is marked as the "server" port).

If no prior data record exists in the flow data structure 162 that matches the current packet, a new flow data record is created in the flow data structure 162 using the IP addresses and port numbers from the current packet, and is linked to the end of the appropriate linked list of flow records. The time that the flow started, i.e. the first packets capture time, is written into the record as the "start" time, in a predetermined field of the data record.

The time of each packet is written into the record "last", overwriting the previous value.

Flow Data Structure

The preferred flow data structure 162 has a plurality of different fields in each record. The preferred flow data structure (in the known C programming language) is as follows, where the index shown as [2] (0 or 1) is "0" if the packet source is the host ip[0], "1" otherwise (e.g. if the packet source is ip[1], then the packet bytes are added to bytes[1], pkts[1] is incremented, etc.):

```
#define SLOTS 131073//no. flows in data table
struct flow_db {
    unsigned long ip[2]; // ip[0]—lower ip address—ip[1]—higher ip address
    unsigned short pt[2]; //tcp or udp ports, pt[0] and pt[1]
    unsigned short service; // port number of server
    unsigned long down; // linked list index
    unsigned long up; // linked list index
    unsigned long start // time Flow started
    unsigned long last; // time Flow ended
    unsigned long state; // Server=0, 2 or 4, UDP=1 (Server Port Marked)
    unsigned long bytes[2]; // bytes sent by ip[0] and ip[1]
    unsigned long pkts[2]; // packets sent by ip[0] and ip[1]
    unsigned long flgs[2]; // bitmap of all TCP flags seen
    unsigned char flag[2][7];//0 bad, 1 reset, 2 urgent, 3 syn, 4 syn-ack, 5 fin, 6 fragments, // (counts of packets seen with various TCP flag combinations)—7 UDP rejects
    unsigned short scans; // max number ports seen for ip pair, detects "Port Scans"} flow[SLOTS];
```

Notice that many of the fields are counters for each host, e.g., the number of packets and bytes sent, the number of packets with various TCP flag-bit combinations sent for TCP flows, the number of ICMP "port-unavailables" for a UDP flow. Also bitmaps can be filled in, such as the bitmap of all TCP flags seen which has been bitwise OR'ed with the TCP flag field of each TCP packet. Data is filled in for the source (originating) host.

The packet classifier thread 510 also adds some data directly to the host data structure 166. Most of this data could be added later by the flow collector thread 520 (such as bytes sent by each host), but adding it on a packet by packet basis allows collection of real time rate information (such as bytes sent in each time interval). These records are indicated in the host data structure 166 below.

Host Data Structure

The host data structure 166 accumulates data on all hosts that are observed participating in a flow. A description of this data structure in C language format follows:

```
#define HOST_SLOTS 65537 // number Host slots
struct host_db {
    // data added by the Packet Classifier Thread
    unsigned long ip ;          //ip address
    unsigned long down ;   // linked list index
    unsigned long up;          // linked list index
    unsigned long start ; // time host record started
    unsigned long last ; // time of last packet from this host
    unsigned long udp_bytes ; // UDP bytes sent and received
    unsigned long bytes_in ; // bytes received
    unsigned long bytes_in_pp ; // Bytes over last 5 min interval
    unsigned long bytes_in_mx ; // max all day
    unsigned long pkts_in ; // packets received
    unsigned long bytes_ot ;    // for Web_alert period
    unsigned long bytes_ot_pp    ; // Bytes sent over 5 min interval
    unsigned long bytes_ot_mx ; // max bytes in 5-min interval all day
    unsigned long pkts_ot ; // packets sent
    unsigned long resets    ; // TCP Reset packets received
    unsigned long rejects    ; // icmp 'port unavailable' packets received
    unsigned long bad_pkts ; // SYN-ACK, and any other non-standard
        combination // data added by the Host Collector Thread
    unsigned long server    ; // 32 common server ports-provided (in
        profile)
    unsigned long client    ; // 32 common server ports-used today
    unsigned long s_profile    ; // 32 common server ports - provided (in
        profile)
    unsigned long c_profile    ; // 32 common server ports-used today
    unsigned short s_list[ODD MAX] ; // list of uncommon (odd) servers
    unsigned short c_list[ODD MAX] ; // list of uncommon (odd) clients
    unsigned long s_flows    ; // Server in this many flows
    unsigned long c_flows    ; // Client in this many flows
    unsigned long pings ; // pings
    unsigned long traces ; // traceroutes run
    unsigned long concern ; // accumulated CI
    // bits set by both threads to record "Alert Messages" such as "Bad
        TCP Flags".
    unsigned long alerts; // bit map of alert conditions
} host[ HOST_SLOTS ]
```

Flow Collector Thread

The flow collector thread 520 runs periodically (e.g., every five minutes) and searches linearly through the entire flow data structure 162 to find flows that have been inactive for a certain time period (e.g., 6 minutes). These flows are considered as finished and a logic-tree analysis is done to classify them as either a normal flow, or a potential probe or other suspicious activity warranting assignment of a concern index value.

Normal flows are those for which the corresponding statistics indicate a normal exchange of information between two hosts. The host that initiated the flow is considered the client (i.e. the computer that sent TCP SYN packets or sent an initial UDP packet). The other host is considered the server (i.e. the computer that sent TCP SYN-ACK packets or responded to a UDP packet). Some data is exchanged during a normal flow.

A potential probe is a flow that appears to have one host (a possible intruder) sending packets to gain information about another host (an intended victim). An example of a potential probe is a flow that has TCP packets of any sort sent by one host (the intruder) and approximately the same number of TCP reset packets sent by the other. Another example is a flow which has UDP packets answered by ICMP "port unavailable" packets. A flow with ICMP "destination unreachable" packets sent by one host would be considered a potential probe being done by the other host.

In accordance with the invention, some potential probes are much more likely to indicate probing than others are. To handle this, a value called the "concern index" is calculated or otherwise determined for each flow, and this value is added to the concern index value being accumulated in the host data structure 166. Table I of FIG. 6 shows one scheme for assigning concern index values due to the flow analysis. After the flow is analyzed, the flow record is written to the flow log file and then cleared from the flow data structure.

Other Concern Index Increments

Concern index (CI) values calculated from packet anomalies also add to a host's accumulated concern index value. Table II of FIG. 7 shows one scheme for assigning concern index values due to other events revealed by the flow analysis. For example, there are many combinations of TCP flag bits that are rarely or never seen in valid TCP connections. When one of these combinations is recognized by the packet classifier thread 510, it directly adds a predetermined value to the sending host's accumulated concern index value. When the packet classifier thread 510 searches along the flow linked-list (i.e. flow data 162) for a match to the current packet 101, it keeps count of the number of flows active with matching IP addresses but no matching port number. If this number exceeds a predetermined threshold value (e.g., 4) and is greater than the previous number noticed, CI is added for an amount corresponding to a "port scan." A bit in the host record is set to indicate that the host has received CI for "port scanning."

A list IP of addresses contacted or probed by each host can be maintained. When this list indicates that more than a threshold number of other hosts (e.g., 8) have been contacted in the same subnet, CI is added to the to the host and a bit in the host record is set to indicate that the host has received CI for "address scanning."

These and other values of concern index are shown for non-flow based events in FIG. 7.

Alert Manager Thread

The alert manager thread 530 runs periodically (e.g., following the flow manager thread 520) and does a linear search through the host data structure 166. As it does so, it compiles a number of lists that are written to various output files for use by user interface programs, i.e. programs that report information from the operation of the intrusion detection system or appliance 150.

For example, the alert manager thread 530 preferably generates an alert list 546 of hosts with CI above a certain threshold. This threshold is adjusted so that the list is about 100 host records long. In accordance with the preferred embodiment of the invention, a user interface program (not shown) will sort this list and display, in order of descending CI value, the top 60 hosts with high CI values. A similar list based on average byte rate over the last time interval (e.g., 5 minutes) is also generated. If a range, or set of ranges, of IP addresses have been defined by the network administrator as "inside addresses," separate lists can be generated for "inside" and "outside" hosts. Numerous other queries and reports 548 can be generated for review and analysis by a network system administrator (SYS ADMIN).

The packet classifier 510 thread collects information on network operations such as packets and bytes on a per-second, per-minute, and per-hour basis. This information is collected on all packets and on certain categories of packets such as TCP and UDP and subsets of these based on port number. Histograms of packet size and TCP or UDP port numbers are also collected. The alert manager thread 530 writes the updated data to various output files for use by the user interface, or for later off-line analysis.

The alert manager 530 also looks for hosts whose CI or traffic (byte rate) exceeds preset alarm thresholds and which have not been handled on previous runs. The new alarm conditions can cause immediate operator notification by an operator notification process 542. These conditions can be highlighted on the user interface, and cause SNMP trap messages to be sent to a network monitor such as HP Openview, and/or email messages to the network administrator which in turn may cause messages to be sent to beepers or cell phones. Messages can also be sent to cause automated devices such as a firewall manager 544 to drop packets going to or from an offending host. It will thus be appreciated that the present invention advantageously operates in conjunction with firewalls and other network security devices and processes to provide additional protection for an entity's computer network and computer resources.

Hardware

A preferred hardware configuration 800 of an embodiment that executes the functions of the above described flow-based engine is described in reference to FIG. 8. FIG. 8 illustrates a typically hardware configuration 800 for a network intrusion detection system. A monitoring appliance 150 serves as a pass-by filter of network traffic. A network device 135, such as a router, switch, hub, tap, or the like, provides the location for connecting the monitoring appliance 150 to the network 899 for monitoring the network traffic.

As illustrated, the monitoring appliance 150 is preferably configured with two network interface cards (NIC) 830 such as 3COM brand model 932 10/100 MHz Ethernet adapters or other adapters to match the network. However, it should be apparent to one skilled in the art that one or more cards can be utilized to accomplish the functions of the presently described dual card system. The monitor NIC 834 is typically set to a promiscuous mode or a similar function. The promiscuous mode is a mode of operation in which every data packet passing through the network device 135 will be received and read. An admin NIC 838 allows network interfacing and handles commands sent from the monitoring appliance 135. A NIC driver 820 enables the network traffic data to be exchanged with the processor 850. Other drivers 825 are utilized to interface or communicate with other devices including peripherals. These peripherals include keyboards, monitors, printers, storage devices, and other input/output devices. As one skilled in the art will appreciate, such drivers are typically packaged with the system.

The operating system 810 for the computer 800 preferably needs to be compatible with the hardware of the monitoring appliance 150. One operating system 810 that can be utilized is the operating system referred to as LINUX. One skilled in the art will appreciate that other operating systems may be readily substituted. As is known to those skilled in the art, the operating system of a computer controls the operation of the processor 850. The processor 850 interfaces with the memory 805 to execute programs. Preferably, the monitoring appliance will have 128 megabytes or more of memory.

As discussed in reference to FIG. 5, the processor 850 executes the packet classifier thread 510, the flow collector thread 520, and the alert manager thread 530. These threads interact with flow data structure 162 and the host data structure 166, as described. The data structures provide temporary storage of information. As discussed in reference to FIG. 5, a log file is maintained on the hard drive 840 for forensic analysis, if desired.

Flow Charts

Figure 9A:
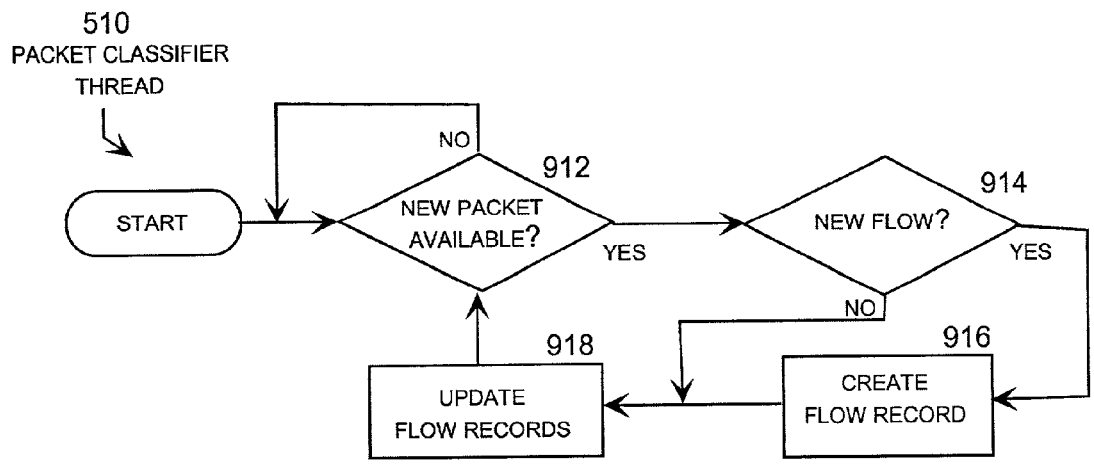
FIG. 9, consisting of FIGS. 9A through 9C, are flow charts of the program threads in an exemplary embodiment of the invention.
Figure 9B:
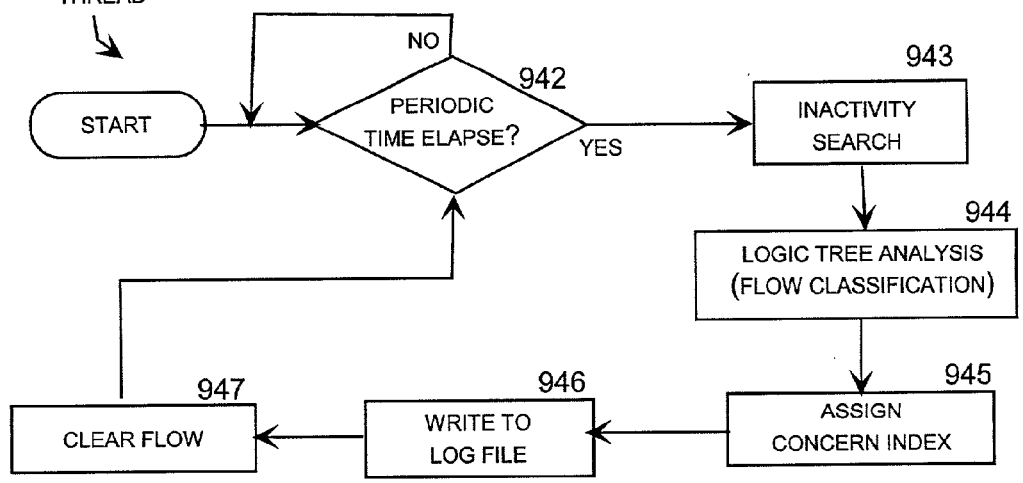
Figure 9C:
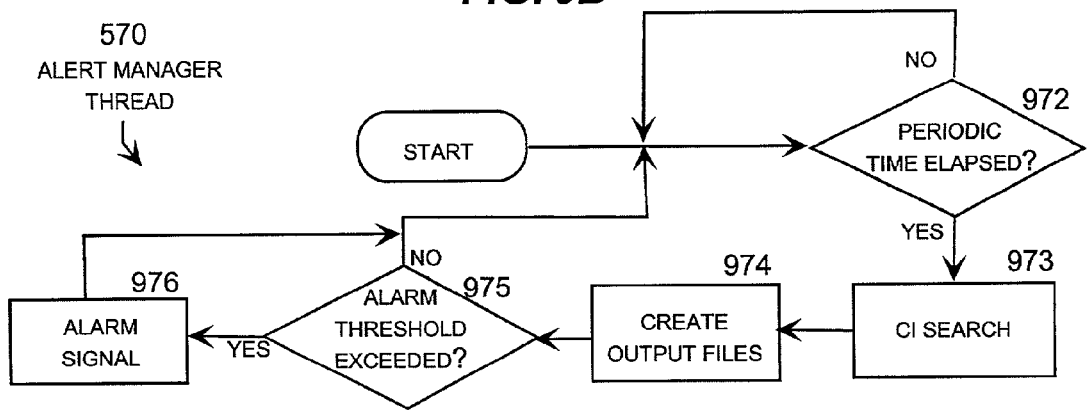

Refer now to FIG. 9 for a discussion of the steps of the preferred packet classifier, flow collector, and alert or alarm manager threads. As previously discussed in reference to FIG. 5, the preferred flow-based intrusion detection engine 155 comprises three operational threads or processes that execute within a system or appliance that implements an embodiment of the invention. The packet classifier thread 510 (FIG. 9A) classifies packets into their associated flow and updates the flow records. The flow collector thread (FIG. 9B) 520 determines a termination of a flow, performs a logic tree analysis to classify the flow, and assigns a corresponding CI value in response to detection of activity warranting an increase in the CI. Finally, the alert or alarm manager thread 530 (FIG. 9C) generates reports and alarm signals if an alarm threshold is exceeded.

In FIG. 9A, the packet classifier thread 510 begins with step 912. In step 912, the thread 510 determines if a new packet is available. If a new packet is not available, the no branch of step 912 is followed to step 912, in which the thread 510 awaits a new packet. If a new packet is available, the yes branch of step 912 is followed to step 914, in which the thread determines if the packet belongs to a new flow.

As discussed previously, the header data if each packet processed is read by the packet classifier thread 510. Based on the source and destination IP addresses, the thread 510 searches for an existing flow in the flow data structure 162, which is embodied as a data array in memory. A symmetric hash of the two IP addresses is used as the index into the array that points to the beginning of a two-way linked list of all flows with that hash value.

Flow processing is done for TCP and UDP packets, and the port numbers in the transport layer header are used to identify the flow record to be updated. For ICMP packets that constitute rejections of a packet, the copy of the rejected packet in the ICMP data field is used to identify the IP addresses and port numbers of the corresponding flow.

A packet 101 is considered to match to a flow data structure record if both IP numbers match and:

a) both port numbers match and no port is marked as the "server" port, or b) the port number previously marked as the "server" port matches, or c) one of the port numbers matches, but the other does not, and the neither port number has been marked as the server port (in this case the matching port number is marked as the "server" port).

If a new flow is determined, the yes branch of step 914 is followed by step 916. In step 916, a new flow record is created. If no flow exists that matches the current packet, a new flow record is started using the IP addresses and port numbers from the current packet, and is linked to the end of the appropriate linked list of flow records.

The IP address with the lower value, when considered as a 32-bit unsigned integer, is designated ip[0] and the corresponding port number is designated pt[0]. The higher IP address is designated ip[1] and the corresponding TCP or UDP port number is designated pt[1]. At some point, either pt[0] or pt[1] may be designated the "server" port by setting a the appropriate bit in a bit map that is part of the flow record (record "state", bits 1 or 2 set).

Step 916 is followed by step 918, in which the flow records in the flow data structure 162 are updated. The time that the flow started, the packet capture time, is written into the record "start." The flow data structures updated by the packet classifier thread is discussed in detail in reference to FIG. 5. Step 918 is returned to step 912, in which the thread 510 determines if a new packet is available.

Referring next to FIG. 9B, the flow collector thread 520 begins with step 942. In step 942, the thread 520 determines if a periodic time has elapsed, e.g. 5 minutes in the disclosed embodiment. If the requisite time period has not elapsed, the no branch of step 942 is followed to step 942, in which the thread 520 awaits the time to elapse.

If the time has elapsed, the yes branch of step 942 is followed to step 943, in which the thread 520 performs an inactivity search. The flow collector thread 520 runs periodically (e.g., every five minutes) and searches linearly through the entire flow data structure 162 to find flows that have been inactive for a certain time period (e.g., 6 minutes, although this time is arbitrary and may be heuristically determined). These flows are considered finished.

Step 943 is followed by step 944. In step 944, a logic-tree analysis is done to classify them as either a normal flow or as a potential probe. Normal flows are those whose statistics indicate a normal exchange of information between two hosts. Preferably, the host that initiated the flow is considered the client (sent TCP SYN packets or sent the initial UDP packet). The other host is considered the server (sent TCP SYN-ACK packets or responded to a UDP packet). Some data is exchanged during a normal flow.

As will be recalled, one exemplary indication of a potential probe is a flow that appears to have one host (the intruder) sending packets to gain information about another host (the victim). An example of a potential probe is a flow that has TCP packets of any sort sent by one host (the intruder) and approximately the same number of TCP reset packets sent by the other. Another example is a flow which has UDP packets answered by ICMP "port unavailable" packets. A flow with ICMP "destination unreachable" packets sent by one host would be considered a potential probe being done by the other host.

Step 944 is followed by step 945, in which a CI value that corresponds to the detected activity is assigned. As previously discussed, some types of communications and packet activities are much more likely to indicate probing than others. An appropriate CI amount for the determined activity is determined, e.g. by reference to a table such as shown in FIG. 7. The corresponding CI value for the determined activity is added to the concern index value being accumulated in the host data structure 166. Table I of FIG. 6 and Table II of FIG. 7 shows one scheme for assigning concern index values due to the flow analysis.

Step 945 is followed by step 946. In step 946, the flow record is written to the flow log file. Step 946 is followed by step 947. In step 947, the flow record is cleared from the flow data structure. After step 947, the thread is returned to step 942, in which the thread awaits for the requisite time.

Referring next to FIG. 9C, the alarm manager thread 530 begins with step 972. In step 972, the thread 530 determines if a periodic time has elapsed. If the requisite time period has not elapsed, the no branch of step 972 is followed to step 972, in which the thread 530 awaits the time to elapse.

If the time has elapsed, the yes branch of step 972 is followed to step 973, in which the thread 530 performs concern index search. The alert manager thread 530 runs periodically (e.g., following the flow manager thread 520) and does a linear search through the host data structure 166.

Step 973 is followed by step 974. In step 974, it compiles a number of lists that are written to various output files for use by the user interface programs. For example, it collects an alert list of hosts with CI above a certain threshold. This threshold may be adjusted so that the list is about 100 host records long. A user interface program will preferably sort this list and display, in order of descending CI value, the top 60 hosts with high CI values. A similar list based on average byte rate over the last time interval (e.g., 5 minutes) is also generated. If a range, or set of ranges, of IP addresses have been defined by the network administrator as "inside addresses," separate lists can be generated for "inside" and "outside" hosts. Numerous other queries and reports 548 can be generated for review and analysis by the network administrator. The alert manager thread 530 writes the updated data to various output files for use by the user interface, or for later off-line analysis.

Step 974 is followed by step 975, in which the thread 530 determines if an alarm threshold has been exceeded. If the alarm threshold has not been exceeded, the no branch of step 975 is returned to perform step 972. In step 972, the thread 530 determines if a requisite time period has elapsed.

If an alarm threshold has been exceeded, the yes branch of step 975 is followed to step 976. In step 976, the alert manager thread generates certain predetermined signals designed to drawn the attention of a system administrator or other interested person. The alert manager 530 looks for hosts whose CI or traffic (byte rate) exceeds preset alarm thresholds and have not been handled on previous runs. The new alarm conditions can cause immediate operator notification. These conditions can be highlighted on the user interface, and cause SNMP trap messages to be sent to a network monitor such as HP Openview, and/or email messages to the network administrator which in turn may cause messages to be sent to beepers or cell phones. Messages can also be sent to cause automated devices such as a firewall manager to drop packets going to or from an offending host. Step 976 is followed by step 972, in which the thread 530 awaits the requisite amount of time.

In view of the foregoing, it will be appreciated that the present invention provides an intrusion detection system that is robust, scalable, efficient, and overcomes various problems with conventional signature-based or pure anomaly-based intrusion detection. It should be understood that the foregoing relates only to the exemplary embodiments of the present invention, and that numerous changes may be made therein without departing from the spirit and scope of the invention as defined by the following claims. Accordingly, it is the claims set forth below, and not merely the foregoing illustration, which are intended to define the exclusive rights of the invention.

INDUSTRIAL APPLICATIONS

A flow-based intrusion detection system efficiently and reliably monitors network traffic for possible intrusions with the ability to be scaled to large traffic flows. Consequently, the flow-based engine has applicability in the fields of network monitoring, network security, network devices, network communications, and similar fields.

What is claimed is:

1. A method of analyzing network communication traffic on a data communication network for determining whether the traffic is legitimate or potential suspicious activity, comprising the steps of:
    monitoring packet headers of packets exchanged between two hosts on the data communication network;
    based on the packet headers, determining the existence of a client/server (C/S) flow as corresponding to a predetermined plurality of packets exchanged between the two hosts that relate to a single service and is characterized by a predetermined C/S flow characteristic;
    assigning a concern index value to a determined C/S flow based upon a predetermined concern index characteristic of the C/S flow;
    maintaining an accumulated concern index comprising concern index values for one or more determined C/S flows associated with a host; and
    issuing an alarm signal in the event that the accumulated concern index for a host exceeds an alarm threshold value.

2. The method of claim 1, wherein the predetermined C/S flow characteristic of a C/S flow is selected from the group comprising: the elapse of a predetermined period of time wherein no packets are exchanged between two hosts, the occurrence of a FiN flag, predetermined characteristics of traffic on a given port, and the occurrence of a RESET packet.

3. The method of claim 1, further comprising the step of communicating a message to a firewall to drop packets going to or from the particular host in response to the alarm signal.

4. The method of claim 1, wherein the alarm signal generates a notification to a network administrator.

5. The method of claim 1, wherein each concern index value associated with a predetermined concern index characteristic is a predetermined fixed value.

6. The method of claim 1, wherein the single service comprises a port number remaining constant for a plurality of packets.

7. The method of claim 1, wherein the suspicious activity is from an inside address or from an outside address.

8. The method of claim 1, wherein the concern index for a suspicious activity is derived by reference to a table of predetermined suspicious activities each having a predetermined concern index value.

9. The method of claim 1, wherein the host for which the concern index is accumulated is an inside host.

10. The method of claim 1, wherein the host for which the concern index is accumulated is an outside host.

11. The method of claim 1, wherein the steps are carried out in a monitoring appliance.

12. The method of claim 11, wherein the monitoring appliance is installed behind a firewall.

13. The method of claim 11, wherein the monitoring appliance is connected before a firewall.

14. The method of claim 11, wherein the monitoring appliance is connected in a DMZ.

15. The method of claim 11, wherein the monitoring appliance is configured to operate as a pass-by filter.

16. The method of claim 11, wherein the monitoring appliance is coupled to a network device.

17. The method of claim 16, wherein the network device is selected from group comprising: router, switch, hub, tap.

18. The method of claim 16, wherein the network device is a network security device.

19. The method of claim 1, wherein the monitoring of packets comprises monitoring on packet header information only.

20. The method of claim 1, wherein the monitoring of packets is carried out in a device operating in a promiscuous mode.

21. The method of claim 1, wherein the alarm signal is provided to a utilization component.

22. The method of claim 21, wherein the utilization component is selected from the group comprising: network security device, email, SNMP trap message, beeper, cellphone, firewall, network monitor, user interface display to an operator.

23. The method of claim 1, wherein the predetermined concern index characteristic comprises a characteristic selected from a table comprising a plurality of prestored second predetermined characteristics each having a predetermined concern index (CI) value.

24. The method of claim 1, wherein the predetermined concern index characteristic comprises one or more of the following characteristics: potential TCP probe, potential UDP probe, half-open attack, TCP stealth port scan, UDP stealth port scan, bad flags, short UDP, address scan, port scan.

25. A method of analyzing network communication traffic on a data communication network for determining whether the traffic is legitimate or potential suspicious activity, comprising the steps of:
    monitoring packet headers of packets exchanged between two hosts that are associated with a single service on the data communications network;
    based on the packet headers, determining the existence of a client/server (C/S) flow as corresponding to a predetermined plurality of packets exchanged between the two hosts;
    collecting C/S flow data from packet headers of the packets in the determined flow;
    based on the collected C/S flow data, assigning a concern index value to a determined C/S flow based on a predetermined concern index characteristic of the C/S flow;
    maintaining an accumulated concern index from C/S flows that are associated with a particular host;
    issuing an alarm signal in the event that the accumulated concern index for the particular host exceeds an alarm threshold value; and
    in response to the alarm signal, sending a message to a utilization component.

26. The method of claim 25, wherein the utilization component is selected from the group comprising: network security device, email, SNMP trap message, beeper, cellphone, firewall, network monitor, user interface display to an operator.

27. The method of claim 6, wherein a C/S flow is characterized by a predetermined C/S flow characteristic selected from the group comprising: the elapse of predetermined period of time where no packets are exchanged between two hosts, the occurrence of a FiN flag, predetermined characteristics of traffic on a given port, and the occurrence of a RESET packet.

28. The method of claim 25, wherein the predetermined concern index characteristic comprises a characteristic selected from a table comprising a plurality of prestored second predetermined characteristics each having a predetermined concern index (CI) value.

29. The method of claim 25, wherein the predetermined concern index characteristic comprises one or more of the following characteristics:
potential TCP probe,
potential UDP probe,
half-open attack,
TCP stealth port scan,
UDP stealth port scan,
bad flags,
short UDP,
address scan,
port scan.

30. A method of analyzing network communication traffic on a data communication network for determining whether the traffic is legitimate or potential suspicious activity, comprising the steps of:
monitoring the packet headers from an exchange of packets between two hosts each having a particular Internet Protocol (IP) address;
based on monitored packet headers, determining the existence of a client/sewer (C/S) flow as corresponding to a predetermined plurality of packets exchanged between a particular port of one of the hosts that remains constant during the plurality of packets;
collecting C/S flow data from packet headers of the packets in a determined C/S flow;
based on the collected C/S flow data, assigning a concern index value to a determined C/S flow;
maintaining a host data structure containing accumulated concern index values from a plurality of determined C/S flows that are associated with the particular host; and
issuing an alarm in the event that the accumulated concern index values for the particular host has exceeded an alarm threshold value.

31. The method of claim 30, wherein each concern index value associated with a respective potential suspicious activity is a predetermined fixed value.

32. The method of claim 30, wherein a C/S flow is characterized by a predetermined C/S flow characteristic selected from the group comprising: the elapse of a predetermined period of time wherein no packets are exchanged between two hosts, the occurrence of a FiN flag, predetermined characteristics of traffic on a given port, and the occurrence of a RESET packet.

33. A system for analyzing network communication traffic and determining potential suspicious activity, comprising:
a computer system operative to:
a) monitor packet headers resulting from the communication of packets on a data communication network;
b) based on monitored packet headers, classify the monitored packets into client/server (C/S) flows, wherein a C/S flow corresponds to a predetermined plurality of packets exchanged between two hosts that are associated with a single service on the network;
c) analyze the C/S flows in order to assign a concern index value to a C/S flow that may signify potential suspicious activity, wherein each concern index value associated with a respective potential suspicious activity is of a predetermined fixed value;
d) generate an alarm signal in response to cumulated concern index values; and
a communication system coupled to the computer system operative to receive packets communicated between hosts on the network.

34. The system of claim 33, wherein a C/S flow is characterized by a predetermined C/S flow characteristic selected from the group comprising: the elapse of a predetermined period of time wherein no packets are exchanged between two hosts, the occurrence of a FiN flag, predetermined characteristics of traffic on a given port, and the occurrence of a RESET packet.

35. A system for analyzing network communication traffic and determining potential suspicious activity, comprising:
a processor operative to:
a) monitor packet headers resulting from the communication of packets on a data communication network;
b) classify the monitored packets into client/server (C/S) flows, wherein a C/S flow corresponds to a predetermined plurality of packets exchanged between two hosts that are associated with a single service on the network;
c) maintain a flow data structure for storing data corresponding to a plurality of C/S flows;
d) analyze the C/S flows in the flow data structure in order to assign a concern index value to a C/S flow that may signify potential suspicious activity, wherein each concern index value associated with a respective potential suspicious activity is of a predetermined fixed value;
e) cumulate assigned concern index values of one or more C/S flows associated with a particular host;
f) maintain a host data structure for storing data associating a cumulated concern index value with each one of a plurality of hosts; and
g) generate an alarm signal in response to cumulated concern index values in the host data structure;
a memory coupled to the processor and operative to store the flow data structure and the host data structure; and
a network interface coupled to the processor operative to receive packets on the data communication network.

36. The system of claim 35, wherein a C/S flow is characterized by a predetermined C/S flow characteristic selected from the group comprising: the elapse of a predetermined period of time wherein no packets are exchanged between two hosts, the occurrence of a FiN flag, predetermined characteristics of traffic on a given port, and the occurrence of a RESET packet.

37. A method of analyzing network communication traffic on a data communication network for potential suspicious activity, comprising the steps of:
monitoring packets exchanged between two hosts on the data communication network;
identifying packets provided by one of the two hosts that have a transport level protocol specifying a packet format that includes a data segment;
in response to determination that the transport level protocol is a User Datagram Protocol (UDP) packet and the data segment associated with the UDP packet contains two bytes or less of data, storing a concern index value of a predetermined amount in a memory in association with information identifying the host that issued the UDP packet; and
issuing an alarm when the cumulated concern index value associated with the host exceeds a predetermined threshold level.

* * * * *